(12) United States Patent
Barry

(10) Patent No.: US 10,394,432 B2
(45) Date of Patent: *Aug. 27, 2019

(54) SPREAD MATRIX WITH STATISTICS

(71) Applicant: Chicago Mercantile Exchange Inc., Chicago, IL (US)

(72) Inventor: James David Russell Barry, London (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,197

(22) Filed: Dec. 20, 2017

(65) Prior Publication Data

US 2019/0102066 A1 Apr. 4, 2019

Related U.S. Application Data

(63) Continuation of application No. 14/307,169, filed on Jun. 17, 2014, now Pat. No. 9,875,004.

(60) Provisional application No. 61/835,928, filed on Jun. 17, 2013.

(51) Int. Cl.
*G06F 17/24* (2006.01)
*G06F 3/0484* (2013.01)
*G06Q 40/04* (2012.01)
*G06F 3/0481* (2013.01)

(52) U.S. Cl.
CPC ........ *G06F 3/04842* (2013.01); *G06F 3/0484* (2013.01); *G06F 3/04817* (2013.01); *G06Q 40/04* (2013.01)

(58) Field of Classification Search
CPC ..... G06F 3/0481; G06F 3/0484; G06F 17/246
See application file for complete search history.

(56) References Cited

U.S. PATENT DOCUMENTS

| | | | | |
|---|---|---|---|---|
| 6,493,681 B1* | 12/2002 | Tertitski | ................. | G06Q 40/04 705/36 R |
| 7,003,729 B1* | 2/2006 | Rajala | .................... | G06Q 30/06 705/27.1 |
| 7,340,040 B1* | 3/2008 | Saylor | .................... | G06Q 40/00 379/67.1 |

(Continued)

OTHER PUBLICATIONS

Oct. 23, 2014—(WO) International Search Report—App PCT/US2014/042751.

(Continued)

*Primary Examiner* — Scott T Baderman
*Assistant Examiner* — Mario M Velez-Lopez
(74) *Attorney, Agent, or Firm* — Lempia Summerfield Katz LLC

(57) ABSTRACT

Systems, methods and user interfaces are provided for displaying spread product market data and statistics. Market data may be arranged in a matrix and statistical information is inserted in the matrix in available space. In some cases, a computer system may receive market data for a plurality of spread products, receive and/or compute statistical information for the plurality of spread products, and generate a user interface screen that includes the market data for the plurality of spread products and the statistical information associated with the plurality of spread products, where the market data and the statistical information are arranged in a matrix.

20 Claims, 3 Drawing Sheets

(56) References Cited

U.S. PATENT DOCUMENTS

| | | | | |
|---|---|---|---|---|
| 7,792,736 | B2* | 9/2010 | Wasendorf, Sr. | G06Q 30/08 379/137 |
| 8,301,535 | B1* | 10/2012 | Zerenner | G06Q 40/06 705/36 R |
| 8,458,065 | B1* | 6/2013 | Zhang | G06Q 40/04 705/35 |
| 8,577,778 | B2* | 11/2013 | Lange | G06Q 30/08 705/35 |
| 8,717,354 | B2* | 5/2014 | Zhu | G06T 19/00 345/419 |
| 9,875,004 | B2* | 1/2018 | Barry | G06Q 40/04 |
| 2002/0099644 | A1* | 7/2002 | Kemp, II | G06Q 30/0275 705/37 |
| 2002/0111896 | A1 | 8/2002 | Ben-Levy et al. | |
| 2003/0009411 | A1* | 1/2003 | Ram | G06F 17/246 705/37 |
| 2004/0148244 | A1 | 7/2004 | Badeau et al. | |
| 2005/0044031 | A1* | 2/2005 | Lebedev | G06Q 40/04 705/37 |
| 2005/0273695 | A1* | 12/2005 | Schnurr | H04W 24/00 715/213 |
| 2006/0020526 | A1 | 1/2006 | Viner | |
| 2006/0059065 | A1 | 3/2006 | Glinberg et al. | |
| 2006/0080596 | A1* | 4/2006 | Bhogal | G06F 9/542 715/213 |
| 2006/0259417 | A1 | 11/2006 | Marynowski et al. | |
| 2010/0293110 | A1 | 11/2010 | Rosenthal et al. | |
| 2011/0066538 | A1 | 3/2011 | Liberman et al. | |
| 2011/0145165 | A1 | 6/2011 | Haldes et al. | |
| 2012/0271748 | A1* | 10/2012 | DiSalvo | G06Q 40/04 705/37 |
| 2015/0154165 | A1 | 6/2015 | O'Donoghue | |

OTHER PUBLICATIONS

CME Group, 25 Proven Strategies for trading options on CME Group futures, © 2008 CME Group, 32 pages.

CQG Spreader User Guide for Traders, Mar. 11, 2013, Software Version 13.58, © 2012 CQG Inc., 76 pages.

Trading Technologies International, Inc., X_TRADER® Spread Matrix Version 7.x Setup Guide, © 2008-2011 Trading Technologies International, Inc., 15 pages.

CGQ Trading with Spread Matrix and Spread Pyramid, Retrieved from site: http://www.cqg.com/Docs/Instructions/SpreadMatrixSpreadPyramid_Trading.pdf on Jun. 10, 2014, 2 pages.

* cited by examiner

SPREAD MATRIX WITH STATISTICS

The present application is a continuation of U.S. patent application Ser. No. 14/307,169 filed Jun. 17, 2014 and claims priority to U.S. Provisional Patent Application Ser. No. 61/835,928, filed Jun. 17, 2013, the entire disclosure of the applications are hereby incorporated by reference.

FIELD OF THE INVENTION

The present invention relates to systems, methods and user interfaces that are utilized in connection with the trading of financial instruments. More particularly, embodiments of the invention provide a spread matrix user interface that includes statistical information.

DESCRIPTION OF THE RELATED ART

In many cases, traders of financial instruments may use graphical user interface systems to view market data details such as prices and to enter orders. Matrixes may be used to display information regarding spread products, such as vertical spreads, horizontal spreads (e.g. calendar spreads), debit spreads, credit spreads, diagonal spreads and the like. For example, for calendar spreads, spread matrixes may be designed to be able to efficiently show all the period spreads for a particular product in a space efficient way and allow trading of those spreads. An illustrative configuration may allow a conventional spread matrix to display the spreads for one product, where the periods may be displayed along the top of the screen with a diagonal list of periods running across the middle of the grid. This illustrative configuration may show the bids and the offers for all the combinations of periods and may allow traders to submit orders.

Traders of spreads and other financial instruments may often be interested in more information than is typically included in a conventional spread matrix. While traders may desire additional information, they may also want the information presented in a concise format that they can quickly review and understand. Therefore, there is a need in the art for systems, methods and user interfaces that provide more information to traders in a concise manner.

SUMMARY OF THE INVENTION

The systems and methods discussed herein overcome at least some of the problems and limitations of the prior art user interfaces that include statistical information in spread matrixes. In various embodiments, the present invention can be partially or wholly implemented on a computer-readable medium, for example, by storing computer-executable instructions or modules, or by utilizing computer-readable data structures. Of course, the methods and systems disclosed herein may also include other additional elements, steps, computer-executable instructions, or computer-readable data structures.

In some cases, a computer-readable medium may contain computer-executable instructions for causing a computer device to perform a method having steps including receiving market data for a plurality of spread products and receiving statistical information for the plurality of spread products. The computer device may further be caused to generate a user interface screen that includes the market data for the plurality of spread products and the statistical information arranged in a matrix.

An illustrative system may include a user interface device and a computer system communicatively coupled to the user interface device via a network. In some cases, the computing system may include one or more processing devices communicatively coupled to a non-transitory memory device. The non-transitory memory device may store instructions that, when executed by the one or more processing devices, may cause the computing system to receive market data for a plurality of spread products, receive statistical information for the plurality of spread products, and generate a user interface screen that includes the market data for the plurality of spread products and the statistical information arranged in a matrix.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
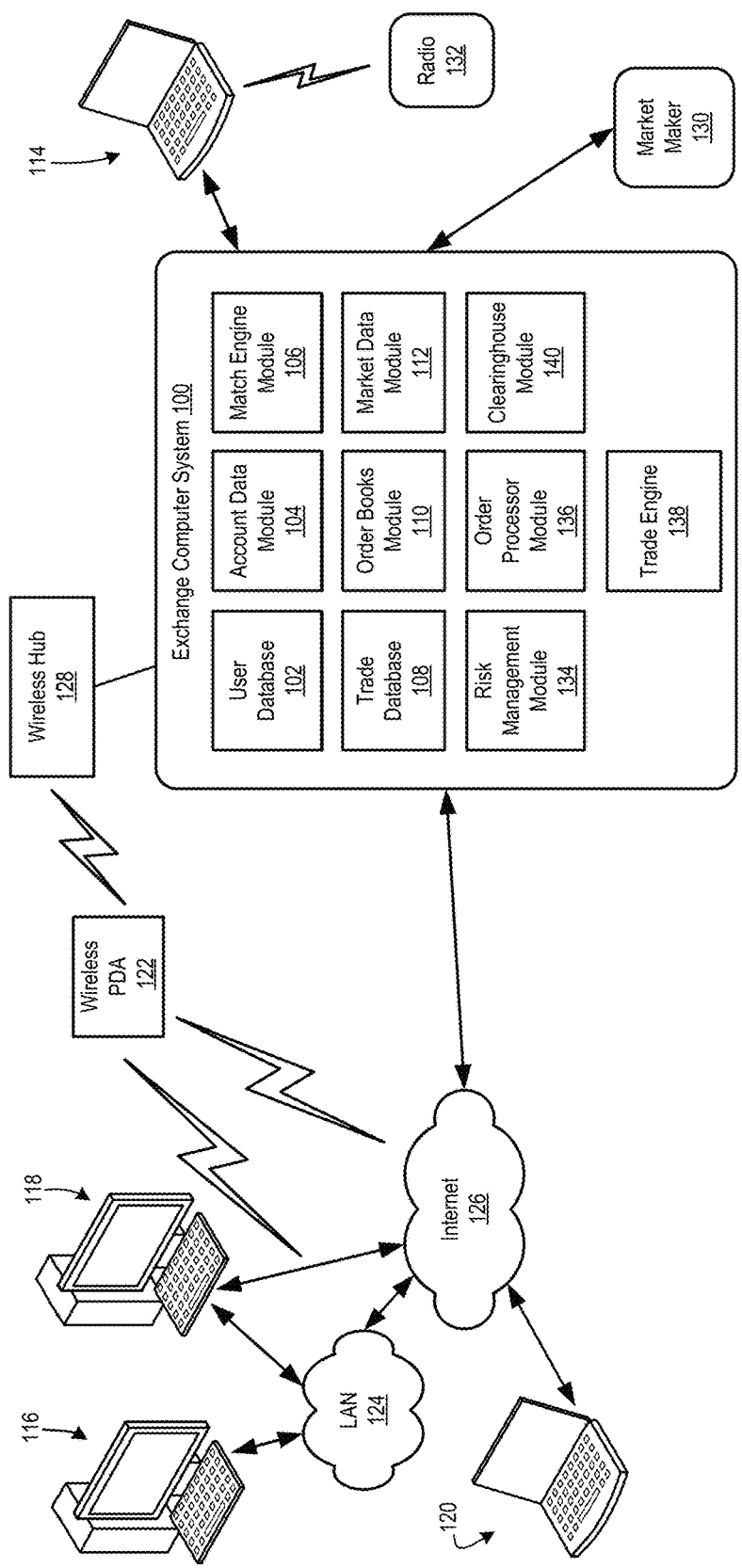
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1.

Exemplary Operating Environment

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In some cases, the exchange computing system 100 may be configured to create and/or price an implied volatility derivative product based on an implied volatility of an underlying financial product. In at least some embodiments, the exchange computer system 100 (or "system 100") receives, stores, generates and/or otherwise and processes data. In accordance with various aspects of the invention, the exchange computing system 100 may obtain pricing information corresponding to the underlying financial product from a financial market. This may promise a more straightforward way for investors to take a position based on implied volatility of a financial product.

In some cases, spread matrix views may be provided in a trading application. These spread matrixes may be designed to show possible period spreads available for a particular product in a space efficient way and/or to allow trading of those spreads. These spread matrices may be used for one or more different spread products. Some futures traders may trade period spread contracts (e.g., horizontal spreads, calendar spreads, etc.) more than the outright contracts. An illustrative "classic" spread matrix may display the spreads available for one product and may have the associated periods along the top of the matrix screen with a diagonal list of periods running across the middle of the matrix grid. Additionally, this illustrative classic spread matrix may show the bids and/or the offers for all the combination of periods. As such, many futures traders in the market rely on these spread matrix views when performing much of their trading activities. Because of this, a spread matrix that may be configurable to allow a trader to customize the spread matrix view and/or include other desirable information may be highly desirable.

Figure 2:
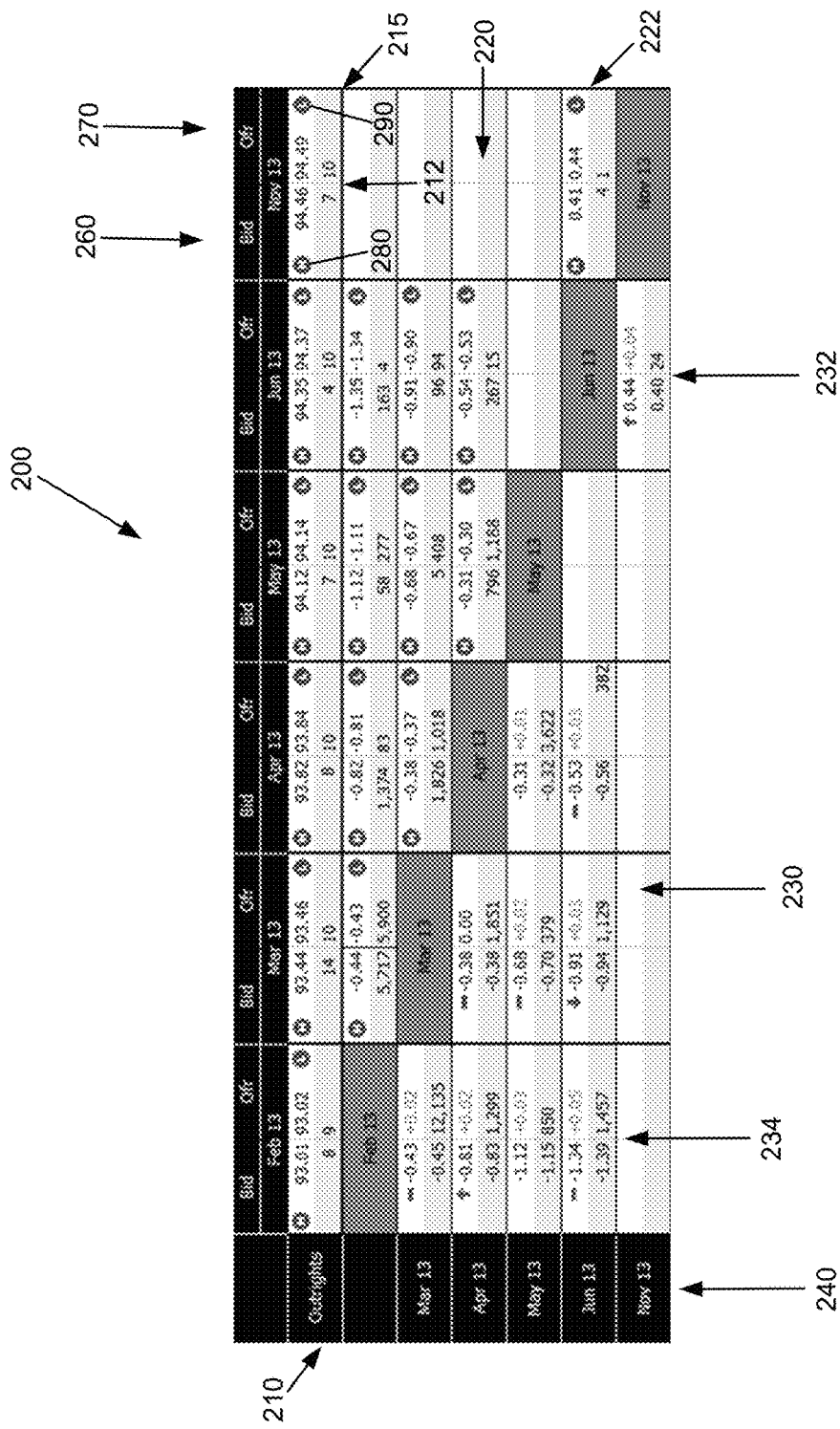
FIG. 2 illustrates an exemplary user interface that includes a spread matrix with statistical information, in accordance with an embodiment of the invention.

FIG. 2 illustrates an exemplary user interface that includes a spread matrix 200 with statistical information, in accordance with an embodiment of the invention. The spread matrix 200 may used for a single financial product. In some cases, the spread matrix 200 may be used for more than one financial product. The spread matrix 200 may be designed to provide information about one or more spread products by displaying information in one or more sections of the spread matrix 200. For example, the spread matrix 200 may include an outright position information section 210, a spread information section 220, and/or a statistical information section 230. In some cases, the outright position information section 210, the spread information section 220 and/or the statistical information section 230 may be separated visually using one or more visual methods, such as by using a line delimiter 215 and/or a line of period labels 225. In the illustrative example, the outright position information section 210 may be separated from the spread information section 220 using the line delimiter 215. This line delimiter 215 may distinguished from other lines in the matrix by using a different line weight, line type (e.g., dashed, double, etc.) and/or line color (e.g., black, blue, red, green, etc.). Similarly, the spread information section 220 may be separated from the statistical information section using the line of period labels 225.

In some cases, the outright position information section 210 may be a row in the matrix that lists bid information (e.g., bid information section 260) and offer information (e.g., offer information section 270) for each time period associated with the outright position. For example, cell 212 may show that for November 13, the best bid may be 94.46 with a quantity of 7 and the best offer may be 94.49 with a quantity of 10. In some cases, each outright position may be arranged in cells, such as the cell 212 having one or more sub-cells that may include the bid and/or offer information. In the illustrative example, each of the bid price, the bid quantity, the offer price, and the offer quantity may be found in different sub-cells of the cell 212. In some cases, a hit icon 280 and a lift icon 290 may be used to enter orders by a user accessing a user interface screen to view the spread matrix 200. The hit icon 280 and the lift icon 290 may be used to enter orders in a conventional manner. In some cases, trading can be done through the hit/lift buttons and/or by using a double click of a user interface device (e.g., a mouse, a touch screen, etc.). As such, trading may be accomplished in a similar manner to trades initiated using a trading application.

The spread matrix 200 may include a time period column 240 associated with time periods that may be chosen when defining spreads and a time period row 250 that may be used to identify time periods associated with the outright positions. In some cases, the line of period labels 225 may be arranged diagonally in the spread matrix 200 corresponding to an intersection of same dates in the time period column 240 and the time period row 250. In some cases, the time period column 240 and line of period labels 225 may be used with time periods identified in the time period row 250 to identify time periods of one or more spreads. Bid and offer information for a particular spread product may be found by the intersection of a row and column of the time periods included in the time period column 240 and the time period row 250.

The statistical information section 230 of the spread matrix 200 may include statistical information and be located below the line of period labels 225. The statistical information may include any information relevant to traders and may be provided by an exchange or other entity. In some cases, the statistical information may be determined using market data obtained from an exchange or other entity. Illustrative statistical information may include a last trade price, high trade information, low trade information, an open price, a close price, a settlement amount, estimated volume information, volume information, open interest information, and/or cleared volume information. In some cases, the statistical information may include a skew, a standard deviation, a mean, a premium, implied volatility information and/or other computed information such as "Greek" statistics (e.g., a delta, a gamma, a vega, a theta), and the like. In some cases, the type of statistical information may be period and/or product specific. In some embodiments users may assign ranks and/or values to types of statistical information that is available. The statistical information may be selected based on the space available on a user interface and/or the rankings.

In some cases, the spread cell 222, 224 may include one or more sub-cells. In the illustrative example, the spread cells 222, 224 may include bid price and quantity information and offer price and quantity information. Each spread cell 222, 224 may be referenced using the period column 240, the period row 250, and/or the period labels 225. The spread cells 222, 224 may also include a hit icon 280 and a lift icon 290 positioned near the prices. For example, a trade may be made at selected prices by clicking on the hit icon 280 or the lift icon 290 and/or by double clicking on the grid. In some cases, a context menu may be associated with the spread cell 222, 224 where a selection may allow a user to navigate to an associated outright product cell and/or to an associated statistics cell 222, 234.

In the illustrative spread matrix, the statistical information may be displayed in a statistics cell 232. The statistics cell may be configured to display statistical information about the spreads in an associated spread cell 222. For example, statistics corresponding to a spread associated with a the June 13 and November 13 time periods (e.g., the spread cell 222) may be associated with statistics displayed in the statistics cell 234. The statistics displayed in the statistics cells may be configured globally for all the cells in the statistical information section 230 or may be configured individually for each spread. In some cases, the statistics cells 232, 234 may be configured to display no statistics, or one or more statistics. For example, the statistics cells 232, 234 have been configured to display 4 statistics in different sub-cells of the statistics cells 232, 234. In an alternative embodiment, statistical information may be displayed when a user uses a pointing device, such as a mouse, to hover over a trading block. In another alternative, some statistical information is displayed as show in FIG. 2 and additional statistical information may displayed when a user uses a pointing device to hover over cell, such as the outright cell 212, the spread cell 222 and/or the statistics cell 232, 234. In some cases, an association between a statistics cell 232 and the associated spread cell 222 via a tooltip that may appear when a pointing device is hovered over the statistics cell 232. In some cases, a context menu may be associated with the statistics cells, where an option (e.g., "go to prices") may be available to navigate a user from the statistics cell 232 to the associated product cell (e.g., the spread cell 232). In some cases, the context menu may include an option to navigate to an associated outright cell (e.g., outright cell 212).

In some cases, the statistics information may include one or more different features for use in identifying a force being experienced by a particular strategy (e.g., a positive sign, a negative sign) and/or for identifying a movement in a particular statistic (e.g., an up arrow, a down arrow). Additionally, other visual elements may be used to highlight these features, such as by assigning a first color (e.g., green) to identify an upward movement and/or positive force and by assigning a second color (e.g., red) to identify a downward movement or negative force.

The user interface shown in FIG. 2 may also include dynamic features. For example, viewable product periods may be automatically expanded or collapsed based on the statistics. In one implementation viewable periods may be dynamically added or removed based on trading activity or volume in a given deferred contract. In some cases, the spread matrix 200 may display a context menu (e.g., "Go to Statistics") when a user pointing device (e.g., a mouse, a finger, a stylus, etc.) is hovered over a cell in one or more of the outright position information section 210 or the spread information section 220. This context menu selection may allow a user to navigate from the outright cell 212 or a spread cell 222, 224 to a statistic cell associated with that particular spread product or outright product.

In some cases, the spread matrix 200 may be available for use with any contract that has configured period spreads in an over-the-counter market environment or other trading vehicle (e.g., Globex). The spread matrix may be configured for use with spreads associated with a single commodity. In some cases, the spread matrix 200 may be created based on existing spread products provided by a financial entity. In other cases, the spread matrix may be created based on a newly identified spread product.

In some cases, a spread matrix 200 including statistical information may be configured by selecting a menu item (e.g., via a drop-down menu) or using an icon. In some cases, the icon may be unique to the spread matrix having statistics so that this functionality may be identifiable from other spread matrix views. Once selected, a configuration screen may show selections for customizing the spread matrix 200, such as for a particular spread product, trading strategy and/or trader preference.

In some cases, a configuration screen and/or window may be provided for editing one or more of a product type, a period, outright information, spread statistics, and period headers. For example, a configuration window may include a product selection field, in which a user may select a spread product to be displayed on the spread matrix 200. This field may include one or more methods of selecting a spread product, including a drop-down menu, a list, a user-entry field, and the like. In some cases, the product selection field may be pre-filled, such as when a value was passed into the configuration field from a different application.

Period information may be selectable by a user as individual periods, such as by using a list. In some cases, the periods may be selected consecutively, but this is not necessary. In some cases, the spread matrix 200 may limit a number of time periods to display, such as by using a pre-defined maximum number of periods (e.g., 6, 8, 9, 10, etc.). In some cases, the maximum number of periods may be a system setting. For example, the system setting may correspond to a maximum number of fields capable of fitting within a window or on a user interface screen.

The outright position information section 210 may be customizable by allowing a user to selectively hide or show the outright position information section 210 within the spread matrix 200. Further, the hit icon 280 and/or the lift icon 290 within a particular cell may be selectively hidden or shown. In some cases, information (e.g., statistical information) associated with the outright product may be displayed below the outright bid and offer information. This information may include quantity information and/or statistical information. In some cases, the statistical information may apply to a particular period, as opposed to price. As such, the user interface and/or a configuration tool may be configured to merge, or otherwise adjust an appearance of the cells in the spread matrix grid. In some cases, the spread matrix 200 may be configurable to display the grid as a square, a rectangle, or other desired shape.

The spread statistical information section 230 may be configured to show a configurable number of statistics within a cell, such as by displaying any selected statistics within sub-cells of the configured statistics cell. For example, the statistics cells 232, 234 have been configured to display 4 different statistics. In some cases, a minimum number of statistics (e.g., 0, 1, etc.) and/or a maximum number of statistics (e.g., 1, 2, 3, 4, etc.) may be defined. In some cases, each statistics cell may be configured individually or may be configured collectively as a statistical information section 230. In some cases, the statistics available for use in the statistics cells may be limited to those applicable to a particular spread product. In some cases, the period column 240 and/or the period row 250 may be selectively hidden or displayed. Further, a user may be allowed to freeze the period headers, e.g., the period column 240 and/or the period row 250 such that the listed periods within the period headers remain visible on a user interface device.

In some embodiments the elements that make up the user interface shown in FIG. 2 are compiled at an exchange or other entity that processes orders and are distributed to traders or others in a form intended to be used to generate the user interface. Traders may receive the distributed data and display the user interface on a desktop computer, tablet computer, mobile terminal or some other computer device. In other embodiments, a trader may use a desktop computer, tablet computer, mobile terminal or some other computer device to compile all of the information and generate the user interface. In this embodiment an exchange or other entity may generate and distribute all of the data, but not distribute the data in a form in a form intended to be displayed with a user interface like the one shown in FIG. 2. The trader's computer device is programmed to generate the user interface.

Figure 3:
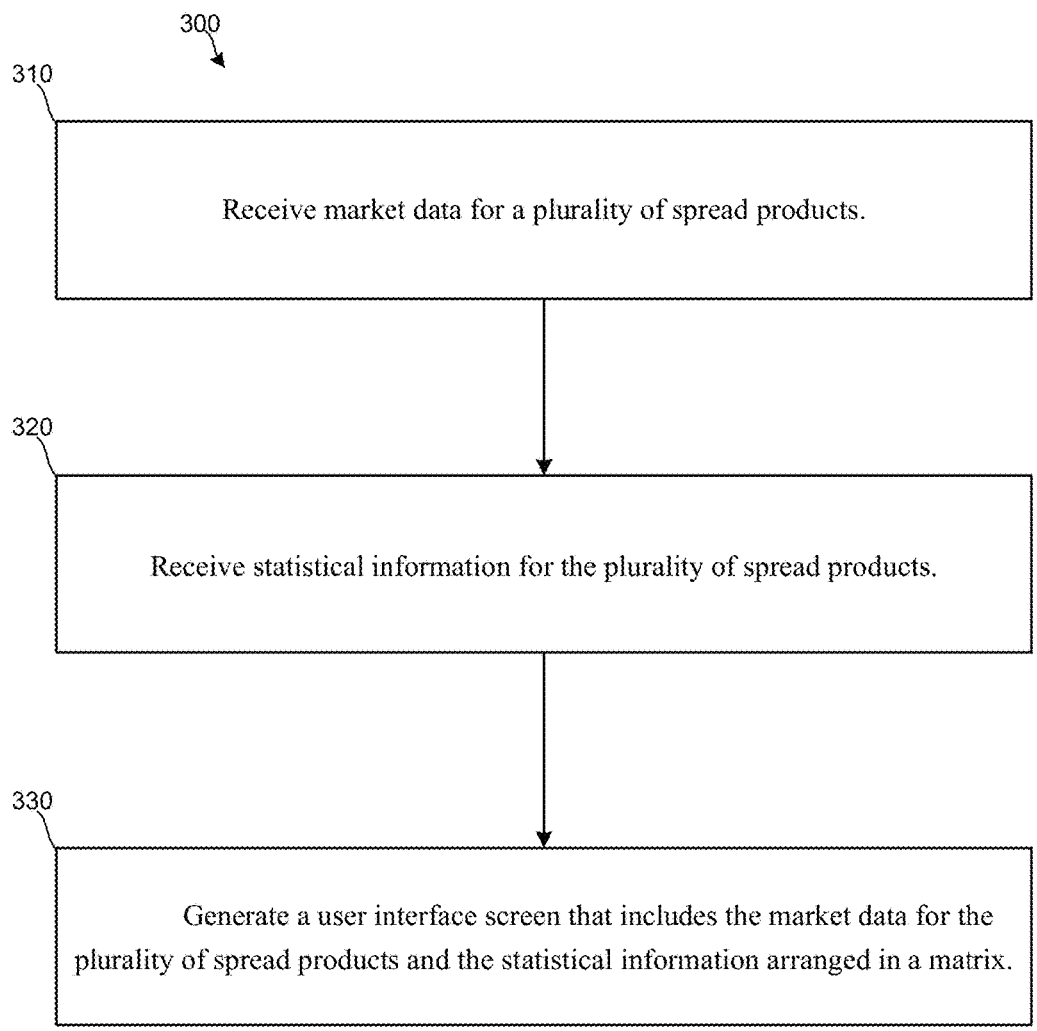
FIG. 3 illustrates an exemplary method using a spread matrix with statistical information, in accordance with an embodiment of the invention.

FIG. 3 illustrates an exemplary method using a spread matrix 200 with statistical information, in accordance with an embodiment of the invention. At 320, a computer device, such as the computer device 118 of FIG. 1, may process instructions that cause the computer device 118 to receive market data for a plurality of spread product. For example, the computing device may receive market information associated with a horizontal spread (e.g., a calendar spread) associated with two or more periods of an underlying outright product. This market information may be received via a wired or wireless network from a financial market, the exchange computer system and the like. In doing so, market information associated with the outright product may be received, as well. In some cases, the computing device may receive market information associated with one or more different spread products, and the associated outright product, such as a vertical spread product, a debit spread product, a credit spread product, a diagonal spread product and the like.

At 320, the computer device 118 may receive statistical information for the plurality of spread products, such as from the exchange computer system 100. In some cases, the computer device 118 may be configured to calculate one or more statistics of the statistical information based on the market data and/or other statistical information received from the exchange computer system. In other cases, the exchange computer system 100 may be configured to calculate one or more statistics of the statistical information based on market data associated with the spread products and/or the outright positions underlying the spread products.

At 330, the computer device 118 may generate a user interface screen that includes the market data for the plurality of spread products and the statistical information arranged in a matrix. For example, the computer device 118 may generate a rectangular matrix for presenting bid prices and offer prices associated with one or more spread products, and associated statistical information, to a user when displayed on a user display device. In some cases, the user display device may be local to the computing device 118 or may be located remotely and communicate to the computing device 118 via one or more wired or wireless networks. In some cases, the spread matrix may be generated having two or more sections for displaying different information about the spread products. For example, the spread matrix 200 may be generated having the outright position information section 210, the spread information section 220, and/or the statistical information section 230. The spread matrix may further be generated to selectively display the outright position information section 210, so that a user may hide the outright position information section 210 from view. The computer device 118 may present an option, such as via a configuration window, or other context menu, to allow a user to select which spread products to show in the spread information section 220 and/or which statistical information to show in the statistical information section.

Further, in some cases, a cell (e.g., the statistical information cell 232) containing statistical information corresponding to a spread product may be linked to a cell (e.g., the spread information cell 222) showing information about the spread product. For example, when a user uses a pointing device (e.g., a mouse, a touch screen, a stylus, etc.) to hover over a spread information cell, statistical information may be shown. In some cases, when a user hovers over a statistical information cell, spread information and/or additional statistical information may be shown. In some cases, a user may select a cell (e.g., a right click) to display a menu that may include options for configuring information to be displayed in the cell and/or links for navigating to associated cells. For example, a menu generated by right clicking on the statistical information cell 234 may include options for modifying which statistical information is shown in the cell and/or may include links to allow a user to navigate directly to the associated spread information cell (e.g., cell 224) and/or to associated outright positions, which may be helpful in navigating larger spread matrixes and/or in navigating spread matrixes on smaller user display devices (e.g., a handheld device, a tablet computer, etc.). Similarly, the a context menu associated with a spread information cell may include options for initiating a trade, links to an associated statistical information cell and/or links to associated outright position cells.

The method 300 may include generating a configuration interface for configuring the user interface to display information corresponding to the plurality of spread products, wherein the configuration interface includes a selection for selecting a product type associated the plurality of spread products, a selection for selecting two or more time periods associated with the plurality of spread products, a selection for selecting an outright position associated with the plurality of spread products, and a selection for selecting which of the statistical information associated with the plurality of spread products is to be displayed.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A non-transitory computer-readable medium containing computer-executable instructions that, when executed by a processor, cause a computer device to:
  receive, via a network from an exchange computing system, market data for a plurality of spread products;
  receive statistical information for the plurality of spread products;
  generate a user interface screen for presentation at a user interface of a user device, the user information screen includes the market data for the plurality of spread products and the statistical information arranged in a matrix, the matrix comprising a plurality of cells with each cell corresponding to one of the plurality of the spread products;
  display, at the user device, in a first portion of the matrix on the user interface screen, first time period information corresponding to the plurality of spread products;
  display, at the user device, in a second portion of the matrix on the user interface screen, second time period information corresponding to the plurality of spread products; and
  display, on the user interface screen at the user device, a line of period labels arranged diagonally in the spread matrix in relation to the first portion of the matrix and the second portion of the matrix, wherein the line of period labels correspond to an intersection of same dates in the first portion of the matrix and the second portion of the matrix.

2. The non-transitory computer-readable medium of claim 1 containing computer-executable instructions that, when executed by a processor, cause the computer device to:
provide, at the user device, in the first portion of the matrix on the user interface screen, at least one input corresponding to a purchase command and at least one input corresponding to a sell command, wherein each of the at least one input corresponding to the purchase command is associated with a corresponding at least on output corresponding to the sell command as an input pair, and wherein the input pair is associated with a different one of the plurality of spread products in a corresponding cell of the matrix.

3. The non-transitory computer-readable medium of claim 2, wherein each of a plurality of input pairs are hidden.

4. The non-transitory computer-readable medium of claim 2, wherein each of a plurality of input pairs include a visible indicator.

5. The non-transitory computer-readable medium of claim 1 containing computer-executable instructions that, when executed by a processor, cause the computer device to:
display market data associated with the plurality of spread products in a spread portion of the matrix; and
display statistical information associated with the plurality of spread products in a statistical information portion of the matrix.

6. The non-transitory computer-readable medium of claim 1 containing computer-executable instructions that, when executed by a processor, cause the computer device to:
receive market data associated with at least one outright position associated with the plurality of spread products; and
display the market data associated with the at least one outright position in an outright position portion of the matrix.

7. The non-transitory computer-readable medium of claim 1, wherein the matrix comprises:
two or more rows corresponding to at least a first time period and a second time period associated with an outright position underlying the plurality of spreads; and
two or more columns corresponding to at least the first time period and a second time period associated with the outright position underlying the plurality of spreads, wherein the two or more rows and two or more columns define a plurality of cells corresponding to spreads associated with at least the first time period and the second time period.

8. The non-transitory computer-readable medium of claim 1 containing computer-executable instructions that, when executed by a processor, cause the computer device to further perform a step comprising:
generating a configuration interface for configuring the user interface to display information corresponding to the plurality of spread products, wherein the configuration interface includes a selection for selecting a product type associated the plurality of spread products, a selection for selecting two or more time periods associated with the plurality of spread products, a selection for selecting an outright position associated with the plurality of spread products, and a selection for selecting which of the statistical information associated with the plurality of spread products is to be displayed.

9. The non-transitory computer-readable medium of claim 1 containing computer-executable instructions that, when executed by a processor, cause the computer device to:
receive, via the network, at least one of a buy order or a sell order from the user interface device, wherein the buy order and the sell order is generated based on user interaction with at least a portion of the user interface screen.

10. The non-transitory computer-readable medium of claim 1 containing computer-executable instructions that, when executed by a processor, cause the computer device to:
update, via the network, the market data, the statistical information, or both the market data and the statistical information associated with the plurality of spread products at a predetermined update rate.

11. The non-transitory computer-readable medium of claim 1 containing computer-executable instructions that, when executed by a processor, cause the computer device to:
generate a plurality of cells in the matrix to display the statistical information associated with the plurality of spread products, wherein each cell of the plurality of cells is associated with a particular spread product; and
generate a link on the user interface that, when selected, causes a user to navigate between a first cell associated with statistical information corresponding to a spread product and a second cell associated with market information corresponding to the spread product.

12. A method comprising:
receiving, via a network, market data for a plurality of spread products;
receiving, via the network, statistical information for the plurality of spread products;
generating, by at least one computing device, a user interface screen that includes the market data for the plurality of spread products and the statistical information arranged in a matrix, the matrix comprising a plurality of cells with each cell corresponding to one of the plurality of the spread products;
displaying, in a first portion of the matrix on the user interface screen, first time period information corresponding to the plurality of spread products;
displaying, in a second portion of the matrix on the user interface screen, second time period information corresponding to the plurality of spread products; and
displaying, on the user interface screen, a line of period labels arranged diagonally in the spread matrix in relation to the first portion of the matrix and the second portion of the matrix, wherein the line of period labels correspond to an intersection of same dates in the first portion of the matrix and the second portion of the matrix.

13. The method of claim 12, comprising:
providing, at the user device, in the first portion of the matrix on the user interface screen, at least one input corresponding to a purchase command and at least one input corresponding to a sell command, wherein each of the at least one input corresponding to the purchase command is associated with a corresponding at least on output corresponding to the sell command as an input pair, and wherein the input pair is associated with a different one of the plurality of spread products in a corresponding cell of the matrix.

14. The method of claim 13, wherein each of a plurality of input pairs are hidden.

15. The non-transitory computer-readable medium of claim 13, wherein each of a plurality of input pairs include a visible indicator of the purchase input and a visible indicator of the sell input.

16. The method of claim 12, comprising:
displaying market data associated with the plurality of spread products in a spread portion of the matrix; and
displaying statistical information associated with the plurality of spread products in a statistical information portion of the matrix.

17. The method of claim 12, comprising:
receiving market data associated with at least one outright position associated with the plurality of spread products; and
displaying the market data associated with the at least one outright position in an outright position portion of the matrix.

18. The method of claim 12, comprising:
communicating, via a network, the user interface displaying the market data for the plurality of spread products and the statistical information associated with the plurality of spread products to a user interface device; and
receiving, via a network, at least one of a buy order or a sell order from the user interface device, wherein the buy order and the sell order is generated based on user interaction with at least a portion of the user interface screen.

19. The method of claim 12, comprising:
receiving a statistical information configuration for each of the plurality of spread products, wherein the statistical information configuration defines selected statistics included in the statistical information to be displayed in the user interface screen; and
displaying the selected statistics in the matrix for each of the plurality of spread products based on the statistical information configuration.

20. A system comprising:
a user interface device;
a computing system communicatively coupled via a network to the user interface device, wherein the computing system includes:
one or more processing devices; and
a non-transitory memory device, communicatively coupled to the one or more processing devices, the non-transitory memory device storing instructions that, when executed by the one or more processing devices, cause the computing system to:
receive market data for a plurality of spread products;
receive statistical information for the plurality of spread products;
generate a user interface screen that includes the market data for the plurality of spread products and the statistical information arranged in a matrix, the matrix comprising a plurality of cells with each cell corresponding to one of the plurality of the spread products; and
display, in a first portion of the matrix on the user interface screen, first time period information corresponding to the plurality of spread products;
provide at least one input corresponding to a purchase command and at least one input corresponding to a sell command, wherein each of the at least one input corresponding to the purchase command is associated with a corresponding at least on output corresponding to the sell command as an input pair, and wherein the input pair is associated with a different one of the plurality of spread products in a corresponding cell of the matrix;
display, in a second portion of the matrix on the user interface screen, second time period information corresponding to the plurality of spread products; and
display, on the user interface screen, a line of period labels arranged diagonally in the spread matrix in relation to the first portion of the matrix and the second portion of the matrix, wherein the line of period labels correspond to an intersection of same dates in the first portion of the matrix and the second portion of the matrix.

* * * * *

UNITED STATES PATENT AND TRADEMARK OFFICE
CERTIFICATE OF CORRECTION

PATENT NO.         : 10,394,432 B2
APPLICATION NO.    : 15/849197
DATED              : August 27, 2019
INVENTOR(S)        : James David Russell Barry Page 1 of 1

It is certified that error appears in the above-identified patent and that said Letters Patent is hereby corrected as shown below:

In the Claims

Claim 2, Column 11, Line 9. Please replace "on" with -- one --.

Claim 13, Column 12, Line 57. Please replace "on" with -- one --.

Claim 20, Column 14, Line 23. Please replace "on" with -- one --.

Signed and Sealed this
Seventeenth Day of December, 2019

Andrei Iancu
*Director of the United States Patent and Trademark Office*